United States Patent
Olsen et al.

(10) Patent No.: US 6,697,723 B2
(45) Date of Patent: Feb. 24, 2004

(54) OCCUPANT BASED FREQUENCY ANALYSIS ALGORITHM

(75) Inventors: William Jerome Olsen, Ypsilanti, MI (US); Ryan Karkkainen, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 09/683,882

(22) Filed: Feb. 27, 2002

(65) Prior Publication Data

US 2003/0163234 A1 Aug. 28, 2003

(51) Int. Cl.$^7$ ............................................. B60R 21/32
(52) U.S. Cl. ........................... 701/45; 701/47; 180/268; 180/271; 180/282; 280/727; 280/728.1; 280/734; 280/735
(58) Field of Search ..................... 701/45, 47; 180/268, 180/271, 282; 280/727, 728.1, 734, 735

(56) References Cited

U.S. PATENT DOCUMENTS

| | | |
|---|---|---|
| 5,232,243 A | 8/1993 | Blackburn et al. |
| 5,474,327 A | 12/1995 | Schousek |
| 5,890,085 A | 3/1999 | Corrado et al. |
| 5,900,677 A | 5/1999 | Musiol et al. |
| 5,983,147 A | 11/1999 | Krumm |
| 5,997,033 A | 12/1999 | Gray et al. |
| 6,012,007 A | 1/2000 | Fortune et al. |
| 6,026,340 A | 2/2000 | Corrado et al. |
| 6,056,079 A | 5/2000 | Cech et al. |
| 6,161,439 A * | 12/2000 | Stanley .................. 73/862.391 |
| 6,252,240 B1 * | 6/2001 | Gillis et al. ............ 250/559.38 |
| 6,288,649 B1 * | 9/2001 | Wolfe ......................... 340/667 |
| 6,364,352 B1 | 4/2002 | Norton |

FOREIGN PATENT DOCUMENTS

| | | | | |
|---|---|---|---|---|
| JP | 10236274 A | * | 9/1998 | ........... B60R/21/32 |
| JP | 11198754 A | * | 7/1999 | ........... B60R/21/32 |

* cited by examiner

Primary Examiner—Michael J. Zanelli
Assistant Examiner—Eric M Gibson
(74) Attorney, Agent, or Firm—Gary A. Smith; Artz & Artz, P.C.

(57) ABSTRACT

An occupant classification system (12) for an automotive vehicle (14) is provided. The system (12) includes a weight-sensing device (24) that generates a weight signal and an accelerometer (26) that generates an acceleration signal. The weight-sensing device (24) and the accelerometer (26) are coupled to a seat system (20). A controller (22) is electrically coupled to the weight-sensing device (24) and the accelerometer (26). The controller (22) determines occupant classification in response to the weight signal and the acceleration signal by monitoring a frequency domain representation of the weight signal divided by the acceleration signal. A method for performing the same is also provided.

20 Claims, 2 Drawing Sheets

OCCUPANT BASED FREQUENCY ANALYSIS ALGORITHM

BACKGROUND OF INVENTION

1. Technical Field

The present invention relates generally to collision countermeasure systems, and more particularly to a method and apparatus for determining occupant classification within an automotive vehicle.

2. Background of the Invention

Collision countermeasure systems are becoming more widely used in automotive vehicles. Countermeasure systems exist in various passive and active forms. Active countermeasure systems are used to aid in prevention of a collision, while passive countermeasure systems are used to aid in the prevention of injury to vehicle occupants in the event of a collision. Examples of passive countermeasures are seat belt pretensioners, air bags, and load limiting seat belts.

Some countermeasure systems consider the weight and/or size of one or more vehicle occupants in determining whether to implement and to what extent to implement an active or passive countermeasure. Gauging or measuring of an occupants weight and/or size will be referred to herein as occupant classification. For example, in the case of an occupant restraint air bag, occupant classification is used as one input or factor in making a decision as to whether to deploy an air bag and/or the appropriate air bag deployment rate. Generally, the larger/heavier the occupant, the higher the rate at which the air bag is deployed.

Known occupant classification systems have several disadvantages associated with them. Some occupant classifications systems use a sealed bladder-type device incorporating a pressure sensor. The bladder is mounted on a seat pan so that the seat occupant sits on top of the bladder and compresses it. The larger the force on the bladder the higher the pressure created in the bladder, which is directly related to the mass of the occupant. An approximately linear relationship is created between the sensed pressure and the weight on the seat system. Under static conditions, the use of a bladder and pressure sensor alone can be fairly accurate, but dynamically the amplitude of the pressure signal generated by the pressure sensor is continuously changing for the same occupant, therefore resulting in false or erroneous occupant classifications.

A seat system typically includes a seat pad disposed on the seat pan, the pad comprising foam or a similar cushioning material. The properties (density, resiliency, etc.) of the foam affect the slope, or gain of the pressure versus weight curve. The properties of the foam change over time as the foam ages and is repeatedly compressed and released during use. Other seat system characteristics also may change over time, further altering the offset and/or gain of the curve. The changing characteristics of the seat system components may cause errors, leading to an increase in the likelihood of false occupant classifications. The countermeasure system may, for example, determine that an occupant is present in the seat system when in actuality an occupant is not present.

To solve the problem of continuously varying seat system characteristics, the occupant classification system may need to be continuously recalibrated or eventually replaced. Recalibration and replacement of the occupant classification system can be costly and time consuming, and may even require replacement of the full seat system and calibration of the new replacement seat system, further increasing costs.

Known weight sensing occupant classification systems may also be prone to false classifications due to seat belt cinching. When a seat belt is buckled around a child safety seat, for example, and tightened, the force of the belt on the child seat is transferred into a downward force on the seat pan, thus artificially increasing the sensed weight. In order to eliminate this problem, seat belt tension sensors are used to measure the tensile force in the belt, and the sensed weight is corrected to compensate for the extra downward loading caused by the belt tension. The addition of seat belt tension sensors provides additional costs in production of the seat system as well as the occupant classification system.

Typically, a particular occupant classification system is calibrated and used with a single type of seat having specific characteristics. Each seat system has different characteristics due to the seat foam, seat cover, seat frame, seat tracks, and other components between the occupant and the occupant classification sensors, and even the vehicle structure to which the seat is mounted. In other words, each occupant classification system is seat specific. Moreover, during a collision event or simply in replacement of a seat system the full occupant classification system may need to be replaced and recalibrated for a new seat system.

Some occupant classification systems use load cells mounted rigidly between the seat frame and the vehicle seat floor mounts to measure occupant weight. The use of load cells reduces replacement costs but does not resolve the false classifications due to dynamic loading or unforeseen use events. When the seat belts are mounted directly to the seat system above the load cells, seat belt tension sensors may not be necessary to correct for seat belt cinching. But if the seat belts are mounted to some portion of the vehicle separate from the seat system (such as to a B-pillar) seat belt tension sensors are still required.

More sophisticated occupant sensing systems are known to use accelerometers to measure vertical acceleration of the seat pan so as to determine that the seat pan is in dynamic motion, and to adjust for this motion and thereby minimize offset errors. In using the accelerometers, the pressure versus weight curve is adjusted by shifting the curve up or down to remove a false zero-offset. Also, as with the load cells, seat belt tension sensors are still required to overcome the problem of seat belt cinching.

Another existing disadvantage with current occupant classification systems, that may become more evident in the future, is that of production variation in a single seat system. Currently, to resolve production variation each occupant classification system is individually calibrated or zeroed. But in order to satisfy upcoming and more stringent government regulations the operating variation between identical occupant classification systems for a particular seat system need to be minimized, to satisfy tighter tolerances in classifying an occupant.

It is desirable to provide an improved occupant classification system for use in a collision countermeasure system of an automotive vehicle that eliminates or minimizes false occupant classifications and is more accurate in determining classification.

SUMMARY OF INVENTION

The foregoing and other advantages are provided by a method and apparatus for classifying an occupant within an automotive vehicle. An occupant classification system for an automotive vehicle is provided. The system includes a weight-sensing device that generates a weight signal and an accelerometer that generates an acceleration signal. The weight-sensing device and the accelerometer are coupled to a seat system. A controller is electrically coupled to the weight-sensing device and the accelerometer. The controller determines occupant classification in response to the weight signal and the acceleration signal by monitoring a frequency domain representation of the weight signal divided by the acceleration signal. A method for performing the same is also provided.

One of several advantages of the present invention is that it provides a system that accurately determines occupant classification during dynamic loading of a seat system.

Another advantage of the present invention is that it determines occupant classification independent of seat belt cinching.

Additionally, the present invention determines occupant classification independent of seat system characteristics.

Therefore, the present invention maybe used in various seat systems without recalibration. Also the present invention may operate in the various seat systems without false occupant classification due to usage and age of the seat system. Furthermore, the present invention may be removed from an old seat system and reused in a new seat system saving costs in system replacement and calibration.

Another advantage of the present invention is that it provides increased vehicle intelligence as in assessing occupant classification and determining whether to perform a countermeasure and at what rate to perform that countermeasure.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to a method and apparatus for classifying an occupant for use in a passive collision countermeasure system of an automotive vehicle, the present invention may be adapted to be used in various systems including: forward collision warning systems, collision avoidance systems, or other vehicle systems that may require occupant classification.

In the following description, various operating parameters and components are described for one constructed embodiment. These specific parameters and components are included as examples and are not meant to be limiting.

Figure 1:
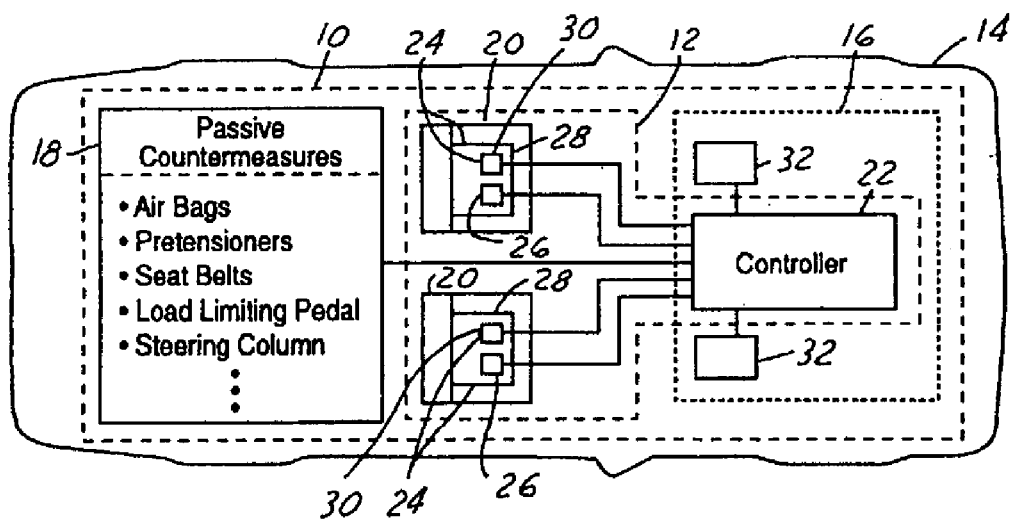
FIG. 1 is a block diagrammatic view of a collision countermeasure system utilizing an occupant classification system for an automotive vehicle in accordance with an embodiment of the present invention.

Referring now to FIG. 1, a block diagrammatic view of a collision countermeasure system 10 utilizing an occupant classification system 12 for an automotive vehicle 14 in accordance with an embodiment of the present invention is shown. The countermeasure system 10 includes the occupant classification system 12, an object classification system 16, and passive countermeasures 18. The occupant classification system 12 determines the classification of an occupant positioned in the seat system 20. The object classification system 16 determines whether an object positioned in a seat system 20 is an occupant or an inanimate object. A controller 22 receives signals from the occupant classification system 12 and the object classification system 16 and determines whether to enable one or more passive countermeasure 18.

The occupant classification system 12 includes a weight-sensing device 24, an accelerometer 26, and the controller 22.

Figure 2:
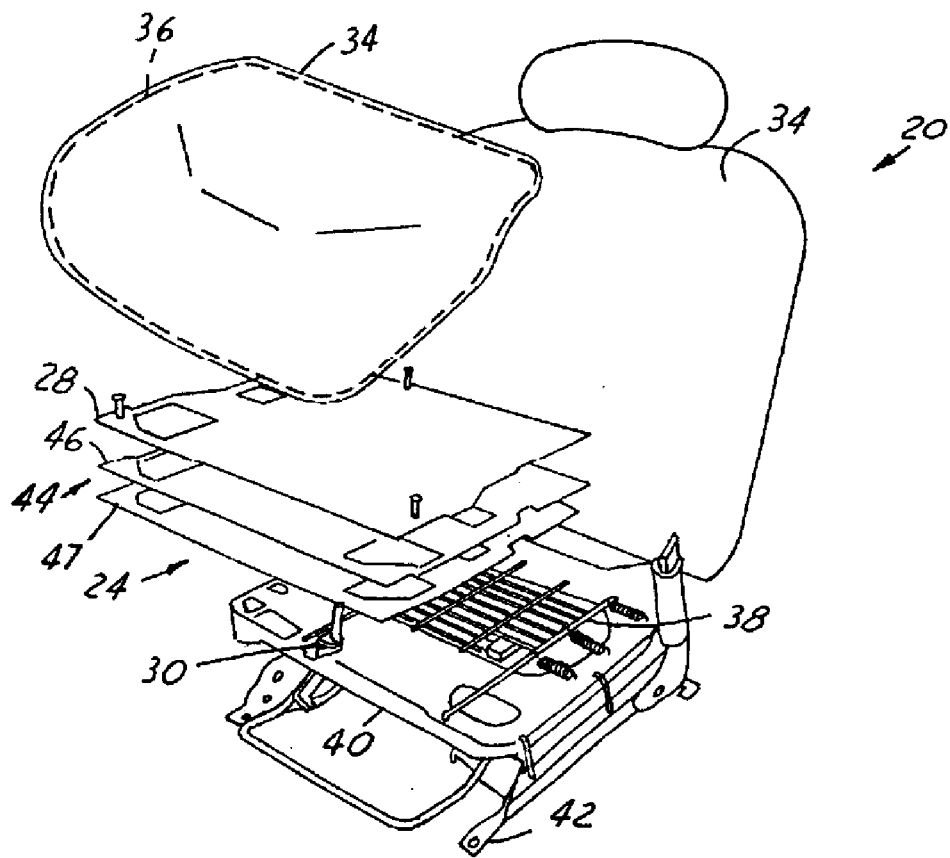
FIG. 2 is a pictorial view of a seat system utilizing the occupant classification system in accordance with an embodiment of the present invention.

The weight-sensing device 24 determines the weight of an object in a seat system 20 and generates a weight signal. The weight-sensing device 24 may be of various type and style including: a bladder assembly 28 and a pressure sensor 30 (see FIG. 2), a strain gage, a load cell, a piezoelectric device, a piezoresistive device, a capacitive device, or other device that has an output signal that may be directly or indirectly correlated to the weight of an occupant or object in or on the seat. The weight-sensing device 24 may be coupled to various portions of the seat system 20 including: a seat pan, a seat frame, a seat trim, a seat pad, or other seat component, or even structure of the vehicle 14 as to sense the weight of an object in the seat system 20, which are best illustrated in FIG. 2.

The accelerometer 26 may be of any appropriate type and style known in the art. The accelerometer 26 determines the acceleration of at least a portion of the seat system 20 and generates an acceleration signal. Although the accelerometer may be coupled to the seat system 20 in various locations, a rigid portion of the seat system 20 is preferred in order to generate a more accurate acceleration signal. The accelerometer 26 may be coupled to the following components of the seat system: a seat pan, a seat frame, a seat suspension, a seat pad, a seat foam or a rigid body including structure of the vehicle 14 coupled to said seat system.

Controller 22 monitors the frequency domain representation of a weight signal generated from the weight-sensing device 24 divided by the frequency domain representation of an acceleration signal generated by the accelerometer 26, as is described more fully herein below. The controller 22 is preferably microprocessor based such as a computer having a central processing unit, memory (RAM and/or ROM), and associated input and output buses. The controller 22 may be a portion of a central vehicle main control unit, an electronic control unit, an interactive vehicle dynamics module, a restraints control module, a main safety controller, or a stand-alone collision controller.

The object classification system 16 includes object detection sensors 32 and the controller 22. The object detection sensors 32 may be infrared sensors, ultrasonic sensors, heart rate sensors, force array sensors, or other object classification sensors known in the art. The object classification system 16 determines whether an object in the seat system 20 is a human occupant or an inanimate object. The controller 22 is preferably operable to enable and/or activate one or more countermeasures 18 only when an occupant is in the seat system 20.

The passive countermeasures 18 may include air bags, seatbelts, knee bolsters, head restraints, load limiting pedals, load limiting steering column devices, seatbelt pretensioners, or other passive countermeasures known in the art.

Referring now to FIG. 2, a pictorial view of the seat system 20 utilizing the occupant classification system 12 in accordance with one possible embodiment of the present invention is shown. The seat system 20 includes seat trim 34, a seat pad 36, the weight-sensing device 24, a seat suspension 38, a seat pan 40, and the seat frame 42. The seat trim 34, the seat pad 36, the seat suspension 38, the seat pan 40, and the seat frame 42 are produced from materials known in the art.

The weight-sensing device 24 as illustrated in this embodiment includes a bladder assembly 44 and the pressure sensor 30. The bladder assembly 44 includes three layers. The first layer 28 is the bladder itself and may be produced from urethane filled with silicone, or other materials having similar properties. The second layer 46 is a backer board to protect the first layer 28 from being punctured during use. The second layer 46 may be produced from plastic or other semi-rigid material known in the art. The third layer 47 is a dampening layer to prevent and/or minimize sound and vibration that may be generated by seat system components. The third layer 47 may be produced from shotty cotton material or other sound dampening material known in the art.

The following is a description of the theory behind the present invention. When an object is placed in the seat system 20 the weight of the object is distributed throughout a contact surface area between the object and the seat system 20 and onto the first layer 28. The weight of the object creates a force (F) over an area (A) of the first layer 28, which generates pressure (P) within the first layer 28 that is sensed by the pressure sensor 30. This relationship is illustrated by the following expression:

$$P = F/A \qquad 1$$

As the velocity of the vehicle 14 increases, road surface vibrations are transferred into the vehicle 14 and to the seat system 20. The accelerations experienced by the seat system 20 are transferred to the occupant located in the seat system 20. Thus the occupant bounces on the seat system 20 causing fluctuations in the pressure, and therefore weight signal. The bouncing of the occupant creates a dynamic component in expression 1, which is incorporated and shown in the following expression:

$$P + P_{dyn} = (F + F_{dyn})/A \qquad 2$$

where $P_{dyn}$ and $F_{dyn}$ are the dynamic pressure and force components, respectively. Ignoring the static component and substituting mass times acceleration for force results in:

$$P_{dyn} = (m_0 * a_0)/A \qquad 3$$

Therefore, dynamic pressure is a function of seat area A, occupant acceleration $a_0$, and occupant mass $m_0$. Seat area A is assumed to be relatively constant.

Figure 3A:
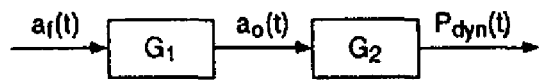
FIG. 3A is a transfer function of the seat system of FIG. 2 in accordance with an embodiment of the present invention.
Figure 3B:
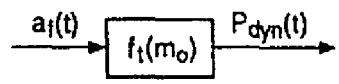
FIG. 3B is a time domain representation of the transfer function of FIG. 3A simplified in accordance with an embodiment of the present invention.
Figure 3C:
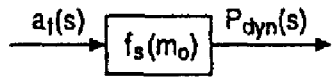
FIG. 3C is a frequency domain representation of the transfer function of FIG. 3B in accordance with an embodiment of the present invention.

The transfer function of the seat-occupant dynamic system is represented by the transfer function of FIG. 3A. In the transfer function of FIG. 3A, $a_f(t)$ is the seat frame acceleration, $a_0(t)$ is the occupant acceleration, and $P_{dyn}(t)$ is the dynamic pressure change in the first layer 28. The seat frame acceleration $a_f(t)$ is considered the input to the seat system 20 and the dynamic pressure $P_{dyn}(t)$ is considered the output. Blocks $G_1$ and $G_2$ represent the seat system 20 as the accelerations pass from the seat frame 42 to the occupant and back to the first layer 28. In the seat system 20, seat characteristics are relatively constant except occupant mass $m_0$. Thus blocks G1 and G2 are combined to form the transfer function of FIG. 3B, where $f_s(m_0)$ is equal to $G_1$ times $G_2$. The only independent variable in the transfer function is occupant mass $m_0$, thereby removing the altering effect of seat system characteristics and seat belt cinching on occupant classification signal. Converting transfer function of FIG. 3B into the frequency domain yields the transfer function of FIG. 3C. Therefore, $$f_s(m_0) = P_{dyn}(s)/a_f(s) \qquad 4$$

Figure 4:
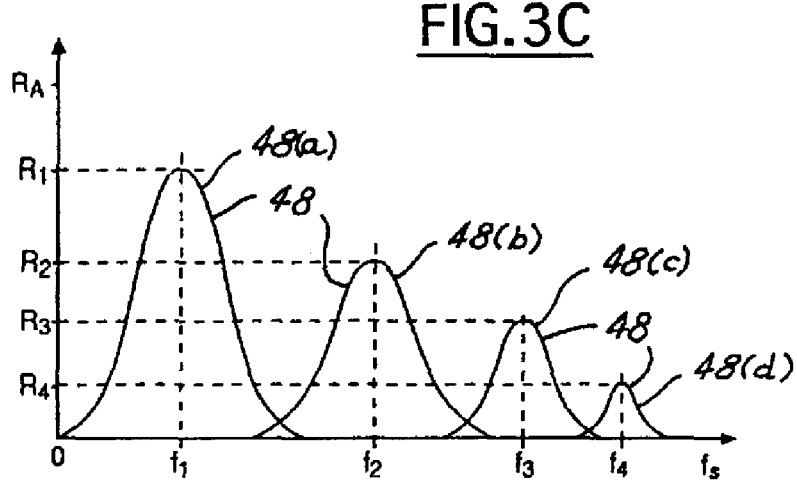
FIG. 4 is a sample graph of a frequency domain representation of a weight signal divided by an acceleration signal from the occupant classification system in accordance with an embodiment of the present invention.

Referring now to FIG. 4, a sample graph of $f_s(m_0)$ is shown. Each frequency curve 48a–48d corresponds to a different occupant mass m(0), with 48a being for the greatest mass and 48d being for the least mass. As the occupant mass $m_0$ increases, the amplitude ratio $R_A$, which is equal to the output $P_{dyn}(s)$ divided by the input $a_f(s)$, tends to increase. Also, as the occupant mass $m_0$ increases, $f_s$ tends to decrease. A dynamic mass factor is established where:

$$f_{dm} = R_A/f_s \qquad 5$$

such that when $f_{dm}$ is greater than or equal to a predetermined dynamic mass threshold $T_{dm}$ a passive countermeasure is enabled.

Figure 5:
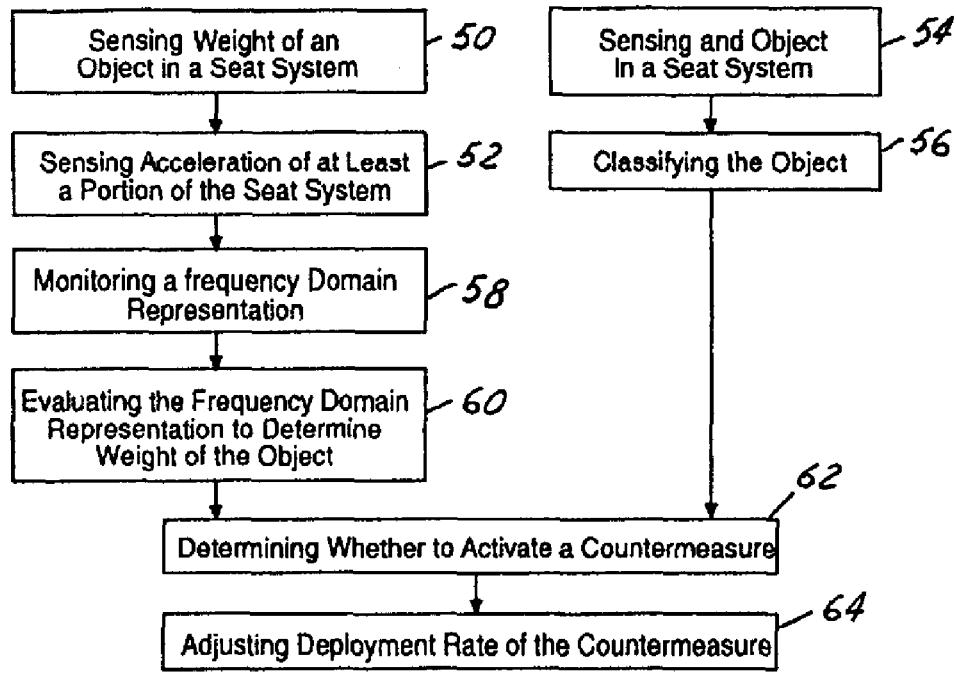
FIG. 5 is a flow chart illustrating a method of classifying an occupant of the automotive vehicle in accordance with an embodiment of the present invention.

Referring now to FIG. 5, a flow chart illustrating a method of classifying an occupant of the automotive vehicle 14 in accordance with an embodiment of the present invention is shown.

In step 50, the weight-sensing device 24 senses weight of an object in the seat system 20 and generates a weight signal directly related to the weight of the object.

In step 52, the accelerometer 26 senses acceleration of at least a portion of the seat system 20 and generates an acceleration signal.

In step 54, the object detection system 16 senses an object in the seat system 20 and generates an object detection signal. Steps 50, 52, and 54 may be performed simultaneously.

In step 56, the controller 22 determines classification of the object in response to the object detection signal using methods known in the art. For example, when a heart rate is detected the object may be deemed to be an animate occupant versus an inanimate object.

In step 58, the controller 22 calculates and monitors the frequency domain representation of the weight signal divided by the acceleration signal $f_s(m_0)$.

In step 60, the controller evaluates the frequency domain representation $f_s(m_0)$ to determine weight or mass of the object in the seat system 20 corresponding to amplitude and frequency of $f_s(m_0)$.

In step 62, the controller 22 correlates the mass of the object to predetermined statistical occupant classifications to determine whether to enable one or more countermeasures 18 in response to the occupant classification signal. For example, when the occupant weighs less than a predetermined weight an air bag may be suppressed, otherwise the air bag is enabled. The controller 22 may optionally suppress the countermeasures 18 when the object is determined not to be an inanimate object rather than an occupant.

In step 64, when the controller 22 determines that a countermeasure 18 should be enabled, the controller 22 may adjust one or more activation parameters, such as deployment rate, of the countermeasure 18 in response to the occupant classification. For example, the deployment rate of an air bag may be set higher for a 95% male than for a 5% female.

Although, the above-described method uses the object detection system 16 to determine whether an object in the seat system 20 is an occupant, a less sophisticated countermeasure system may operate without the object classification system 16 using the occupant classification system 12 alone.

The present invention provides an occupant classification system that determines occupant classification independent of individual seat system characteristics and belt cinching. In so doing, the present invention is versatile in that it may be utilized in various seat systems within a vehicle product line without different calibration parameters for each seat system and is easily serviced. Also, the present invention provides accurate occupant classification without operating variation. The present invention may also be reused from one seat system to another. The present invention therefore reduces costs involved in calibration, replacement, and production of seat systems, countermeasure systems, and related components.

The above-described apparatus, to one skilled in the art, is capable of being adapted for various purposes and is not limited to the following systems: forward collision warning systems, collision avoidance systems, vehicle systems, or other systems that may require occupant classification. The above-described invention may also be varied without deviating from the spirit and scope of the invention as contemplated by the following claims.

What is claimed is:

1. An occupant classification system for an automotive vehicle comprising:
    a weight-sensing device coupled to a seat system and generating a weight signal;
    an accelerometer coupled to said seat system and generating an acceleration signal; and
    a controller electrically coupled to said weight-sensing device and said accelerometer, said controller determining occupant classification in response to said weight signal and said acceleration signal by monitoring a frequency domain representation of the weight signal divided by said acceleration signal.

2. A system as in claim 1 wherein said weight-sensing device is coupled to at least one of: a seat pan, a seat frame, a seat trim, or a seat pad.

3. A system as in claim 1 wherein said weight-sensing device is at least one of: a bladder assembly and a pressure sensor, a strain gage, a load cell, a piezoelectric device, a piezoresistive device, or a capacitive device.

4. A system as in claim 1 wherein said accelerometer is mounted to at least one of: a seat pan, a seat frame, a seat suspension, a seat pad, a seat foam or a rigid body coupled to said seat system.

5. A system as in claim 1 wherein said controller in determining occupant classification evaluates amplitude and frequency of said frequency domain representation to determine weight of an object in said seat system.

6. A collision countermeasure system for an automotive vehicle comprising:
    an occupant classification system comprising;
        a weight-sensing device generating a weight signal;
        an accelerometer generating an acceleration signal;
        a seat system coupled to said weight-sensing device and said accelerometer; and
        a controller electrically coupled to said weight-sensing device and said accelerometer, said controller determining occupant classification in response to said weight signal and said acceleration signal by monitoring a frequency domain representation of the weight signal divided by a frequency domain representation of the acceleration signal;
    said controller determining whether to activate a countermeasure in response to said occupant classification.

7. A system as in claim 6 wherein said controller in determining whether to activate a countermeasure adjusts deployment rate of said countermeasure in response to said occupant classification.

8. A system as in claim 6 wherein said countermeasure is at least one of: an air bag, a seatbelt, a knee bolster, a head restraint, a load limiting pedal, a load limiting steering device, or a pretensioner.

9. A system as in claim 6 further comprising:
    an object classification sensor electrically coupled to said controller and generating a object classification signal;
    said controller determining whether to activate said countermeasure in response to said object classification signal.

10. A system as in claim 9 wherein said object classification sensor is at least one of: an infrared sensor, an ultrasonic sensor, a heart rate sensor, or a force array sensor.

11. A method of classifying an occupant within an automotive vehicle comprising:
    generating a weight signal in response to a weight of an object in a seat system;
    generating an acceleration signal in response to an acceleration of at least a portion of said seat system; and
    determining classification of said object in response to said weight signal and said acceleration signal by monitoring a frequency domain representation of said weight signal divided by said acceleration signal.

12. A method as in claim 11 further comprising comparing amplitude and frequency of said frequency domain representation to determine weight of an object in said seat system.

13. A method as in claim 11 farther comprising determining whether to activate a countermeasure in response to said occupant classification.

14. A method as in claim 11 further comprising adjusting deployment rate of said countermeasure in response to said occupant classification.

15. A method as in claim 11 further comprising determining whether said object is an occupant.

16. A method as in claim 11 wherein determining occupant classification said controller compares predetermined statistical occupant classifications to said frequency domain representation.

17. A method as in claim 11 wherein a countermeasure is activated when a dynamic frequency factor is greater than or equal to a predetermined dynamic mass threshold.

18. An occupant classification system for an automotive vehicle comprising:
    a weight-sensing device coupled to a seat system and generating a weight signal;
    an accelerometer coupled to said seat system and generating an acceleration signal; and a controller electrically coupled to said weight-sensing device and said accelerometer, said controller determining occupant classification in response to said weight signal and said acceleration signal by monitoring a frequency domain representation of the weight signal divided by the acceleration signal, said controller evaluating the amplitude and frequency of said frequency domain representation to determine weight of an object in said seat system.

19. A system as in claim 18 wherein said controller in determining occupant classification activates a countermeasure when a dynamic frequency factor is greater than or equal to a predetermined dynamic mass threshold.

20. A system as in claim 18 further comprising:

an object classification sensor electrically coupled to said controller and generating an object classification signal;

said controller determining whether to activate a countermeasure in response to said object classification signal.

* * * * *